US012531076B2

(12) United States Patent
Resch et al.

(10) Patent No.: US 12,531,076 B2
(45) **Date of Patent: *Jan. 20, 2026**

(54) POST FILTER FOR AUDIO SIGNALS

(71) Applicant: DOLBY INTERNATIONAL AB, Dublin (IE)

(72) Inventors: Barbara Resch, Solna (SE); Kristofer Kjörling, Solna (SE); Lars Villemoes, Jarfalla (SE)

(73) Assignee: DOLBY INTERNATIONAL AB, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/643,296

(22) Filed: Apr. 23, 2024

(65) Prior Publication Data

US 2024/0274145 A1 Aug. 15, 2024

Related U.S. Application Data

(60) Continuation of application No. 18/185,691, filed on Mar. 17, 2023, now Pat. No. 11,996,111, which is a (Continued)

(51) Int. Cl.
*G10L 19/00* (2013.01)
*G10L 19/02* (2013.01)
(Continued)

(52) U.S. Cl.
CPC .............. *G10L 19/26* (2013.01); *G10L 19/02* (2013.01); *G10L 19/032* (2013.01); *G10L 19/09* (2013.01);
(Continued)

(58) Field of Classification Search
CPC .......... G10L 19/26; G10L 19/22; G10L 19/24
See application file for complete search history.

(56) References Cited

U.S. PATENT DOCUMENTS 4,052,568 A 10/1977 Jankowski
4,696,040 A 9/1987 Doddington
(Continued)

FOREIGN PATENT DOCUMENTS

CA 2094780 A1 10/1994
CN 1104010 A 6/1995
(Continued)

OTHER PUBLICATIONS

ETSI , Digital cellular telecommunications system (Phase 2+) , 3GPP TS 26.290 version 6.3.0 Release 6 , フランス , 2005 年06 月 , 2005, p. 57-59, Jan. 2019.
(Continued)

*Primary Examiner* — Daniel Abebe

(57) ABSTRACT

In some embodiments, a pitch filter for filtering a preliminary audio signal generated from an audio bitstream is disclosed. The pitch filter has an operating mode selected from one of either: (i) an active mode where the preliminary audio signal is filtered using filtering information to obtain a filtered audio signal, and (ii) an inactive mode where the pitch filter is disabled. The preliminary audio signal is generated in an audio encoder or audio decoder having a coding mode selected from at least two distinct coding modes, and the pitch filter is capable of being selectively operated in either the active mode or the inactive mode while operating in the coding mode based on control information.

7 Claims, 11 Drawing Sheets

Related U.S. Application Data continuation of application No. 17/532,775, filed on Nov. 22, 2021, now Pat. No. 11,610,595, which is a continuation of application No. 17/073,228, filed on Oct. 16, 2020, now Pat. No. 11,183,200, which is a continuation of application No. 16/351,133, filed on Mar. 12, 2019, now Pat. No. 10,811,024, which is a continuation of application No. 15/792,589, filed on Oct. 24, 2017, now Pat. No. 10,236,010, which is a division of application No. 15/086,409, filed on Mar. 31, 2016, now Pat. No. 9,858,940, which is a continuation of application No. 14/936,408, filed on Nov. 9, 2015, now Pat. No. 9,343,077, which is a continuation of application No. 13/703,875, filed as application No. PCT/EP2011/060555 on Jun. 23, 2011, now Pat. No. 9,224,403.

(60) Provisional application No. 61/361,237, filed on Jul. 2, 2010.

(51) Int. Cl.

| | |
|---|---|
| ***G10L 19/032*** | (2013.01) |
| ***G10L 19/09*** | (2013.01) |
| ***G10L 19/12*** | (2013.01) |
| ***G10L 19/125*** | (2013.01) |
| ***G10L 19/20*** | (2013.01) |
| ***G10L 19/22*** | (2013.01) |
| ***G10L 19/26*** | (2013.01) |
| ***G10L 21/003*** | (2013.01) |
| ***G10L 21/007*** | (2013.01) |
| ***G10L 21/013*** | (2013.01) |
| *G10L 19/107* | (2013.01) |

(52) U.S. Cl.

CPC ............ *G10L 19/12* (2013.01); *G10L 19/125* (2013.01); *G10L 19/20* (2013.01); *G10L 19/22* (2013.01); *G10L 19/265* (2013.01); *G10L 21/003* (2013.01); *G10L 21/007* (2013.01); *G10L 21/013* (2013.01); *G10L 19/0212* (2013.01); *G10L 19/107* (2013.01)

(56) References Cited

U.S. PATENT DOCUMENTS

| | | | | |
|---|---|---|---|---|
| 4,896,361 | A | 1/1990 | Gerson | |
| 4,969,192 | A | 11/1990 | Chen | |
| 5,664,055 | A | 9/1997 | Kroon | |
| 5,774,835 | A * | 6/1998 | Ozawa | G10L 19/26 704/229 |
| 5,778,335 | A | 7/1998 | Ubale | |
| 5,802,109 | A | 9/1998 | Sano | |
| 5,864,798 | A | 1/1999 | Miseki | |
| 6,072,844 | A | 6/2000 | Inoue | |
| 6,073,092 | A | 6/2000 | Kwon | |
| 6,098,036 | A | 8/2000 | Zinser, Jr. | |
| 6,114,859 | A | 9/2000 | Koda | |
| 6,138,093 | A | 10/2000 | Ekudden | |
| 6,240,386 | B1 | 5/2001 | Thyssen | |
| 6,334,105 | B1 | 12/2001 | Ehara | |
| 6,363,340 | B1 | 3/2002 | Sluijter | |
| 6,385,195 | B2 | 5/2002 | Sicher | |
| 6,385,578 | B1 | 5/2002 | Lee | |
| 6,584,441 | B1 * | 6/2003 | Ojala | G10L 19/26 704/200 |
| 6,658,383 | B2 | 12/2003 | Koishida et al. | |
| 6,714,908 | B1 | 3/2004 | Naka | |
| 6,735,567 | B2 | 5/2004 | Gao et al. | |
| 6,785,645 | B2 | 8/2004 | Khalil | |
| 6,810,381 | B1 | 10/2004 | Sasaki | |
| 6,862,567 | B1 | 3/2005 | Gao | |
| 7,020,605 | B2 | 3/2006 | Gao | |
| 7,110,942 | B2 | 9/2006 | Thyssen | |
| 7,124,077 | B2 | 10/2006 | Wang | |
| 7,167,828 | B2 | 1/2007 | Ehara | |
| 7,222,070 | B1 | 5/2007 | Stachurski | |
| 7,426,466 | B2 | 9/2008 | Ananthapadmanabhan et al. | |
| 7,478,040 | B2 | 1/2009 | Thyssen | |
| 7,529,660 | B2 | 5/2009 | Bessette et al. | |
| 7,707,034 | B2 | 4/2010 | Sun | |
| 7,873,511 | B2 | 1/2011 | Herre et al. | |
| 7,933,769 | B2 | 4/2011 | Bessette | |
| 7,945,055 | B2 | 5/2011 | Taleb | |
| 7,979,271 | B2 | 7/2011 | Bessette | |
| 8,095,362 | B2 | 1/2012 | Gao | |
| RE43,191 | E | 2/2012 | Arslan et al. | |
| 8,332,213 | B2 | 12/2012 | Gournay | |
| 8,554,548 | B2 | 10/2013 | Ehara | |
| 8,599,981 | B2 * | 12/2013 | Oshikiri | G10L 19/24 375/350 |
| 8,682,652 | B2 | 3/2014 | Herre | |
| 8,719,011 | B2 * | 5/2014 | Morii | G10L 19/038 704/200 |
| 8,738,385 | B2 | 5/2014 | Chen | |
| 9,031,834 | B2 | 5/2015 | Coorman | |
| 9,070,364 | B2 | 6/2015 | Oh | |
| 2002/0016161 | A1 | 2/2002 | Dellien | |
| 2003/0004711 | A1 | 1/2003 | Koishida | |
| 2003/0009325 | A1 | 1/2003 | Kirchherr | |
| 2003/0088405 | A1 | 5/2003 | Chen | |
| 2003/0088406 | A1 | 5/2003 | Chen | |
| 2004/0064311 | A1 | 4/2004 | Sinha | |
| 2004/0068399 | A1 | 4/2004 | Ding | |
| 2005/0004793 | A1 | 1/2005 | Ojala | |
| 2005/0091046 | A1 | 4/2005 | Thyssen | |
| 2005/0165603 | A1 | 7/2005 | Bessette | |
| 2005/0192797 | A1 | 9/2005 | Makinen | |
| 2005/0246164 | A1 | 11/2005 | Ojala | |
| 2005/0267742 | A1 | 12/2005 | Makinen | |
| 2006/0047522 | A1 | 3/2006 | Ojanpera | |
| 2006/0116874 | A1 * | 6/2006 | Samuelsson | G10L 21/0208 704/228 |
| 2006/0167683 | A1 | 7/2006 | Hoerich | |
| 2006/0182091 | A1 | 8/2006 | Park | |
| 2006/0190247 | A1 | 8/2006 | Lindblom | |
| 2006/0271354 | A1 | 11/2006 | Sun | |
| 2006/0293902 | A1 | 12/2006 | Kim | |
| 2007/0016427 | A1 | 1/2007 | Thumpudi | |
| 2007/0147518 | A1 | 6/2007 | Bessette | |
| 2007/0174051 | A1 | 7/2007 | Oh | |
| 2007/0225971 | A1 | 9/2007 | Bessette | |
| 2007/0282603 | A1 | 12/2007 | Bessette | |
| 2008/0004869 | A1 | 1/2008 | Herre | |
| 2008/0279388 | A1 | 11/2008 | Oh | |
| 2009/0012797 | A1 | 1/2009 | Boehm | |
| 2009/0016426 | A1 | 1/2009 | Sato | |
| 2009/0022261 | A1 | 1/2009 | Suhling | |
| 2009/0043574 | A1 | 2/2009 | Gao | |
| 2009/0044231 | A1 | 2/2009 | Oh | |
| 2009/0046815 | A1 | 2/2009 | Oh | |
| 2009/0055196 | A1 | 2/2009 | Oh | |
| 2009/0067642 | A1 | 3/2009 | Buck | |
| 2009/0110201 | A1 | 4/2009 | Kim | |
| 2009/0210234 | A1 | 8/2009 | Sung | |
| 2009/0210237 | A1 | 8/2009 | Shen | |
| 2009/0216541 | A1 | 8/2009 | Oh et al. | |
| 2009/0240504 | A1 | 9/2009 | Pang et al. | |
| 2009/0265168 | A1 | 10/2009 | Kang et al. | |
| 2009/0299757 | A1 | 12/2009 | Guo | |
| 2009/0313009 | A1 | 12/2009 | Kovesi | |
| 2009/0319264 | A1 | 12/2009 | Yoshida | |
| 2010/0010807 | A1 | 1/2010 | Oh | |
| 2010/0017200 | A1 | 1/2010 | Oshikiri | |
| 2010/0063801 | A1 * | 3/2010 | Bruhn | G10L 19/26 704/E21.001 |
| 2010/0070270 | A1 * | 3/2010 | Gao | G10H 1/0041 704/207 |
| 2010/0098199 | A1 | 4/2010 | Oshikiri | |
| 2010/0100373 | A1 * | 4/2010 | Ehara | G10L 19/26 704/219 |

(56) References Cited

U.S. PATENT DOCUMENTS

| | | | | |
|---|---|---|---|---|
| 2010/0217607 | A1 | 8/2010 | Neuendorf | |
| 2010/0241427 | A1 | 9/2010 | Kovesi | |
| 2010/0262420 | A1* | 10/2010 | Herre | G10L 19/20 704/201 |
| 2010/0268542 | A1 | 10/2010 | Kim | |
| 2011/0076968 | A1 | 3/2011 | Seshadri | |
| 2011/0173011 | A1 | 7/2011 | Geiger | |
| 2011/0282656 | A1 | 11/2011 | Grancharov et al. | |
| 2011/0320196 | A1 | 12/2011 | Choo et al. | |
| 2012/0101824 | A1 | 4/2012 | Chen | |
| 2016/0021383 | A1 | 1/2016 | Wittmann | |
| 2020/0042415 | A1 | 2/2020 | Maddukuri | |

FOREIGN PATENT DOCUMENTS

| | | | |
|---|---|---|---|
| CN | 1567205 | A | 1/2005 |
| CN | 1873778 | A | 12/2006 |
| CN | 101145343 | A | 3/2008 |
| CN | 101256771 | A | 9/2008 |
| CN | 101617362 | A | 12/2009 |
| EP | 1262956 | B1 | 4/2005 |
| EP | 1747556 | A1 | 1/2007 |
| EP | 1990799 | A1 | 11/2008 |
| EP | 2096629 | A1 | 9/2009 |
| EP | 2128858 | A1 | 12/2009 |
| JP | H09-46268 | A | 2/1997 |
| JP | H09-50298 | A | 2/1997 |
| JP | H09-81192 | A | 3/1997 |
| JP | H09-261184 | A | 10/1997 |
| JP | 09326772 | A * | 12/1997 |
| JP | H09-326772 | A | 12/1997 |
| JP | H10-143195 | A | 5/1998 |
| JP | 11-003099 | A | 1/1999 |
| JP | H11-045100 | A | 2/1999 |
| JP | 2000-206999 | A | 7/2000 |
| JP | 2000305598 | A * | 11/2000 |
| JP | 2001-147700 | A | 5/2001 |
| JP | 3183826 | B2 * | 7/2001 |
| JP | 2001-249700 | A | 9/2001 |
| JP | 2001-513916 | A | 9/2001 |
| JP | 2002-149200 | A | 5/2002 |
| JP | 2002-517022 | A | 6/2002 |
| JP | 2003-186487 | A | 7/2003 |
| JP | 2004053676 | A | 2/2004 |
| JP | 2004302257 | A | 10/2004 |
| JP | 2005-528647 | A | 9/2005 |
| JP | 2007-525707 | A | 9/2007 |
| JP | 2010517083 | A | 5/2010 |
| JP | 2010-520503 | A | 6/2010 |
| JP | 2010-520505 | A | 6/2010 |
| JP | 2012-505423 | A | 3/2012 |
| JP | 2013-533983 | A | 8/2013 |
| KR | 102030335 | A | 10/2019 |
| RU | 2262748 | C2 | 10/2005 |
| RU | 2319223 | C2 | 3/2008 |
| RU | 2327230 | C2 | 6/2008 |
| RU | 2339088 | C1 | 11/2008 |
| RU | 2376656 | C1 | 12/2009 |
| RU | 2387022 | C2 | 4/2010 |
| RU | 2389085 | C2 | 5/2010 |
| RU | 2390856 | C2 | 5/2010 |
| RU | 2008146294 | A | 5/2010 |
| WO | 95/28699 | A1 | 10/1995 |
| WO | 1995/028699 | A1 | 10/1995 |
| WO | 97/31367 | A1 | 8/1997 |
| WO | 99/38155 | A1 | 7/1999 |
| WO | 1999/038155 | A | 7/1999 |
| WO | 2005078706 | A1 | 8/2005 |
| WO | 2005/081230 | A1 | 9/2005 |
| WO | 2005/081231 | A1 | 9/2005 |
| WO | 2005/104095 | A1 | 11/2005 |
| WO | 2005/111567 | A1 | 11/2005 |
| WO | 2005/112004 | A1 | 11/2005 |
| WO | 2007/055507 | A1 | 5/2007 |
| WO | 2007/086646 | A1 | 8/2007 |
| WO | 2007/126015 | A1 | 11/2007 |
| WO | 2007/142434 | A1 | 12/2007 |
| WO | 2008/071353 | A2 | 6/2008 |
| WO | 2008/072701 | A1 | 6/2008 |
| WO | 2008/072913 | A1 | 6/2008 |
| WO | 2008/082133 | A1 | 7/2008 |
| WO | 2008/086920 | A1 | 7/2008 |
| WO | 2008/104663 | A1 | 9/2008 |
| WO | 2008120438 | A1 | 10/2008 |
| WO | 20080138267 | | 11/2008 |
| WO | 2008/151755 | A1 | 12/2008 |
| WO | 2009/022193 | A2 | 2/2009 |
| WO | 2009/100768 | A1 | 8/2009 |
| WO | 2009/114656 | A1 | 9/2009 |
| WO | 2010/003532 | A1 | 1/2010 |
| WO | 2010/040522 | A2 | 4/2010 |
| WO | WO2011048117 | A1 | 4/2011 |

OTHER PUBLICATIONS

3GPP TS 26.290 v8.0.0 (Dec. 2008), 3rd Generation Partnership Project; Technical Specification Group Service and System Aspects; Audio Codec Processing Functions; Extended Adaptive Multi-Rate—Wideband (AMR-WB+) code; Transcoding functions (Release 8), 84 pages.

Anonymous: "Study on ISO/IEC 23003-3:201X/CD of Unified Speech and Audio Coding" MPEG Meeting Motion Picture Expert Group or ISO/IEC JTC1/SC29/WG11 Nov. 16, 2010.

Bessette, B. et al. "A Wideband Speech and Audio Codec at 16/24/32 kbit/s Using Hybrid ACELP/TCX Techniques" 1999 IEEE Workshop on Speech Coding Proceedings, pp. 7-9.

Bessette, B. et al. "Universal Speech/Audio Coding Using Hybrid ACELP/TCX Techniques" ICASSP 2005 International Conference on IEEE, Mar. 18-23, 2005, vol. 3.

Chen, J.H. et al. "Adaptive Postfiltering for Quality Enhancement of Coded Speech" IEEE Transactions on Speech and Audio Processing, vol. 3, No. 1, Jan. 1995.

ETSI TS 126 071 v5.0.0 (Jun. 2002), Universal Mobile Telecommunications System (UMTS); AMR Speech Codec; General Description.

ETSI TS 126 090 v5.0.0 (Jun. 2002) Universal Mobile Telecommunications System (UMTS); AMR Speech Codec; Transcoding Functions (3GPPTS 26.090 version 5.0.0 Release 5).

ETSI TS 126 290 v10.0.0 (Apr. 2011) Digital Cellular Telecommunications System (Phase 2+); Universal Mobile Telecommunications System (UMTS); LTE; Audio Codec Processing Functions; Extended Adaptive Multi-Rate-Wideband (AMR-WB+) codec; Transcoding Functions.

ETSI TS 132 612 "Digital Cellular Telecommunications System (Phase 2+)" 3GPP TS 26.290 version 6.3.0, pp. 57-59 (Jun. 2005).

Ghitza, O. et al. "Scalar LPC Quantization Based on Format JND's" IEEE Transactions on Acoustics, Speeech and Signal Processing, vol. 34, Issue 4, pp. 697-708, published in Aug. 1986.

Grancharov, V et al. "Noise-Dependent Postfiltering" IEEE International Conference on Acoustics, Speech, and Signal Processing, May 17-21, 2004, pp. I—457-60, vol. 1.

ISO/IEC 14496-3:2009(E) "Information Technology—Coding of Audio-Visual Objects" Part 3: Audio, Fourth Edition, Sep. 1, 2009, 1178 pages.

ITU-T G.722.2 Wideband Coding of Speech at Around 16 kbit/s Using Adaptive Multi-Rate Wideband (AMR-WB) Series G: Transmission Systems and Media, Digital Systems and Networks, Digital Terminal Equipments—Coding of Analogue Signals by Methods other than PCM (Jul. 2003).

Labonte, Francis, "Etude, Optimisation et Implementation d'un Quantificateur Vectoriel Agebrique Encastre Dans Un Codeur Audio Hybride ACELP/TCX" 2003, Corporate Source Institution.

Lecomte, J. et al. "An Improved Low Complexity AMR-WB+ Encoder Using Neural Networks for Mode Selection" AES Convention Oct. 2007.

Neuendorf, Max, "WD7 of USAC"MPEG Meeting Apr. 19-23, 2010.

(56) References Cited

OTHER PUBLICATIONS

Ojanpera, J. et al "Long term predictor for transform domain perceptual audio coding," in Proceedings of the 107th AES Convention, New York, NY, USA, Sep. 1999.
Ramprashad, Sean A. "The Multimode Transform Predictive Coding Paradigm" IEEE Transactions on Speech and Audio Processing, vol. 11, No. 2, Mar. 2003.
Resch, B. et al "Finalization of CE on an Improved Basspost Filter Operation for the ACELP of USAC" ISO/IEC JTC1/SC29/WG11, MPEG 2010, Oct. 2010, Guangzhou, China.
Resch, B. et al. "CE Proposal on Improved Bass-Post Filter Operation for the ACELP of USAC" MPEG Meeting Jul. 26-30, 2010, Geneva.
Schroeder, R. et al. "Code-Excited Linear Prediction (CELP): High-Quality Speech at Very Low Bit Rates" ICASSP 1985, Apr. 1985, vol. 10, pp. 937-940.
Song, J. et al "Enhanced Long-Term Predictor for Unified Speech and Audio Coding" IEEE International Conference on Acoustics, Speech and Signal processing, Prague, 2011, pp. 505-508.
Song, J. et al "Harmonic enhancement in low bitrate audio coding using an efficient long-term predictor," EURASIP Journal on Advances in Signal Processing, Received Feb. 8, 2010; Published Aug. 15, 2010.
Bessette, B., et al., The Adaptive Multirate Wideband Speech Code (AMR-WB), IEEE Transactions on Speech and Audio Processing, vol. 10, No. 8, Nov. 2002, p. 620-636, 17 pages.
ETSI TS 126 290 V.6.3.0 (Jun. 2005), Digital cellular telecommunications system (Phase 2+), Universal Mobile Telecommunications System (UMTS), Audio codec processing functions, 3GPP TS 26.290 version 6.3.0, Release 6, p. 1-86, 87 pages.
Fuchs, G., et al., A Speech Coder Post-Processor Controlled by Side-Information, ICASSP 2005, p. 433-436, 4 pages.
Schuller, G., et al., Perceptual Audio Coding Using Adaptive Pre-and Post-Filters and Lossless Compression, IEEE Transactions on Speech and Audio Processing, vol. 10, No. 6, Sep. 2002, p. 379-390, 12 pages.
Valin, J., et al., A Full-Bandwidth Audio Codec With Low Complexity and Very Low Delay, 17th European Signal Processing Conference, Aug. 24-28, 2009, Glasgow, Scotland, p. 1254-1258, 5 pages.
Valin, J., et al., A High-Quality Speech and Audio Codec With Less Than 10-ms Delay, IEEE Transactions on Audio, Speech, and Language Processing, vol. 18, No. 1, Jan. 2010, p. 58-67, 10 pages.
"Windows Media Audio Voice" Wikipedia. https://wiki.multimedia.cx/index.php/Windows_media_Audio_Voice, 2010, 7 pages.
Bultje, R., Windows Media Audio Decoder, https://ffmpeg.org/releases/, Jun. 15, 2010, Source Code.
ISO/IEC 11172-3:1993(E), Information technology—Coding of moving pictures and associated audio for digital storage media at up to about 1.5 Mbit/s—Part 3: Audio, 14 pages.
Ogunfunmi, T., et al., Principles of Speech Coding, CRC Press, 2010, p. 174-241, 54 pages.
Rabiner, L., et al., Theory and Applications of Digital Speech Processing, Prentice Hall, 2011, p. 603-613 and 783-809, 44 pages.
Sullivan, G. et al., "New Standardized Extensions of MPEG4-AVC/H.264 for Professional-Quality Video Applications" Proc. 2007 IEEE International Conference on Image Processing, ICIP 2007, p. I-13-I-16, 5 pages.

* cited by examiner

POST FILTER FOR AUDIO SIGNALS

CROSS-REFERENCE TO RELATED APPLICATIONS

This application is a continuation of U.S. patent application Ser. No. 18/185,691 filed on Mar. 17, 2023, which is a continuation of U.S. patent application Ser. No. 17/532,775 filed on Nov. 22, 2021 (now U.S. Pat. No. 11,610,595, issued Mar. 21, 2023), which is a continuation of U.S. patent application Ser. No. 17/073,228 filed on Oct. 16, 2020, (now U.S. Pat. No. 11,183,200, issued Nov. 23, 2021), which is a continuation of U.S. patent application Ser. No. 16/351,133 filed on Mar. 12, 2019, (now U.S. Pat. No. 10,811,024, issued Oct. 20, 2020), which is a continuation of U.S. patent application Ser. No. 15/792,589, filed Oct. 24, 2017 (now U.S. Pat. No. 10,236,010, issued Mar. 19, 2019), which is a divisional of U.S. patent application Ser. No. 15/086,409, filed Mar. 31, 2016 (now U.S. Pat. No. 9,858,940, issued Jan. 2, 2018), which is a continuation of U.S. patent application Ser. No. 14/936,408, filed Nov. 9, 2015 (now U.S. Pat. No. 9,343,077, issued May 17, 2016), which is a continuation of U.S. patent application Ser. No. 13/703,875, filed Dec. 12, 2012 (now U.S. Pat. No. 9,224,403, issued Dec. 29, 2015), which is the 371 National Stage of International Application No. PCT/EP2011/060555 having an international filing date of Jun. 23, 2011. PCT/EP2011/060555 claims priority to U.S. Provisional Patent Application No. 61/361,237, filed Jul. 2, 2010, the contents of each of which are hereby incorporated by reference in their entirety.

TECHNICAL FIELD

The present invention generally relates to digital audio coding and more precisely to coding techniques for audio signals containing components of different characters.

BACKGROUND

A widespread class of coding method for audio signals containing speech or singing includes code excited linear prediction (CELP) applied in time alternation with different coding methods, including frequency-domain coding methods especially adapted for music or methods of a general nature, to account for variations in character between successive time periods of the audio signal. For example, a simplified Moving Pictures Experts Group (MPEG) Unified Speech and Audio Coding (USAC; see standard ISO/IEC 23003-3) decoder is operable in at least three decoding modes, Advanced Audio Coding (AAC; see standard ISO/IEC 13818-7), algebraic CELP (ACELP) and transform-coded excitation (TCX), as shown in the upper portion of accompanying FIG. 2.

The various embodiments of CELP are adapted to the properties of the human organs of speech and, possibly, to the human auditory sense. As used in this application, CELP will refer to all possible embodiments and variants, including but not limited to ACELP, wide- and narrow-band CELP, SB-CELP (sub-band CELP), low- and high-rate CELP, RCELP (relaxed CELP), LD-CELP (low-delay CELP), CS-CELP (conjugate-structure CELP), CS-ACELP (conjugate-structure ACELP), PSI-CELP (pitch-synchronous innovation CELP) and VSELP (vector sum excited linear prediction). The principles of CELP are discussed by R. Schroeder and S. Atal in *Proceedings of the IEEE International Conference on Acoustics, Speech, and Signal Processing* (*ICASSP*), vol. 10, pp. 937-940, 1985, and some of its applications are described in references 25-29 cited in Chen and Gersho, *IEEE Transactions on Speech and Audio Processing*, vol. 3, no. 1, 1995. As further detailed in the former paper, a CELP decoder (or, analogously, a CELP speech synthesizer) may include a pitch predictor, which restores the periodic component of an encoded speech signal, and a pulse codebook, from which an innovation sequence is added. The pitch predictor may in turn include a long-delay predictor for restoring the pitch and a short-delay predictor for restoring formants by spectral envelope shaping. In this context, the pitch is generally understood as the fundamental frequency of the tonal sound component produced by the vocal chords and further coloured by resonating portions of the vocal tract. This frequency together with its harmonics will dominate speech or singing. Generally speaking, CELP methods are best suited for processing solo or one-part singing, for which the pitch frequency is well-defined and relatively easy to determine.

To improve the perceived quality of CELP-coded speech, it is common practice to combine it with post filtering (or pitch enhancement by another term). U.S. Pat. No. 4,969,192 and section II of the paper by Chen and Gersho disclose desirable properties of such post filters, namely their ability to suppress noise components located between the harmonics of the detected voice pitch (long-term portion; see section IV). It is believed that an important portion of this noise stems from the spectral envelope shaping. The long-term portion of a simple post filter may be designed to have the following transfer function:

$$H_E(z) = 1 + \alpha\left(\frac{z^T + z^{-T}}{2} - 1\right),$$

where T is an estimated pitch period in terms of number of samples and a is a gain of the post filter, as shown in FIGS. 1 and 2. In a manner similar to a comb filter, such a filter attenuates frequencies 1/(2T), 3/(2T), 5/(2T), . . . , which are located midway between harmonics of the pitch frequency, and adjacent frequencies. The attenuation depends on the value of the gain a. Slightly more sophisticated post filters apply this attenuation only to low frequencies—hence the commonly used term bass post filter—where the noise is most perceptible. This can be expressed by cascading the transfer function $H_E$ described above and a low-pass filter $H_{LP}$. Thus, the post-processed decoded $S_E$ provided by the post filter will be given, in the transform domain, by $$S_E(z) = S(z) - \alpha S(z) P_{LT}(z) H_{LP}(z),$$

$$\text{where } P_{LT}(z) = 1 - \frac{z^T + z^{-T}}{2}$$

and S is the decoded signal which is supplied as input to the post filter. FIG. 3 shows an embodiment of a post filter with these characteristics, which is further discussed in section 6.1.3 of the Technical Specification ETSI TS 126 290, version 6.3.0, release 6. As this figure suggests, the pitch information is encoded as a parameter in the bit stream signal and is retrieved by a pitch tracking module communicatively connected to the long-term prediction filter carrying out the operations expressed by $P_{LT}$.

The long-term portion described in the previous paragraph may be used alone. Alternatively, it is arranged in series with a noise-shaping filter that preserves components in frequency intervals corresponding to the formants and attenuates noise in other spectral regions (short-term portion; see section III), that is, in the 'spectral valleys' of the formant envelope. As another possible variation, this filter aggregate is further supplemented by a gradual high-pass-type filter to reduce a perceived deterioration due to spectral tilt of the short-term portion.

Audio signals containing a mixture of components of different origins—e.g., tonal, non-tonal, vocal, instrumental, non-musical—are not always reproduced by available digital coding technologies in a satisfactory manner. It has more precisely been noted that available technologies are deficient in handling such non-homogeneous audio material, generally favouring one of the components to the detriment of the other. In particular, music containing singing accompanied by one or more instruments or choir parts which has been encoded by methods of the nature described above, will often be decoded with perceptible artefacts spoiling part of the listening experience.

SUMMARY OF THE INVENTION

In order to mitigate at least some of the drawbacks outlined in the previous section, it is an object of the present invention to provide methods and devices adapted for audio encoding and decoding of signals containing a mixture of components of different origins. As particular objects, the invention seeks to provide such methods and devices that are suitable from the point of view of coding efficiency or (perceived) reproduction fidelity or both.

The invention achieves at least one of these objects by providing an encoder system, a decoder system, an encoding method, a decoding method and computer program products for carrying out each of the methods, as defined in the independent claims. The dependent claims define embodiments of the invention.

The inventors have realized that some artefacts perceived in decoded audio signals of non-homogeneous origin derive from an inappropriate switching between several coding modes of which at least one includes post filtering at the decoder and at least one does not. More precisely, available post filters remove not only interharmonic noise (and, where applicable, noise in spectral valleys) but also signal components representing instrumental or vocal accompaniment and other material of a 'desirable' nature. The fact that the just noticeable difference in spectral valleys may be as large as 10 dB (as noted by Ghitza and Goldstein, *IEEE Trans. Acoust., Speech, Signal Processing*, vol. ASSP-4, pp. 697-708, 1986) may have been taken as a justification by many designers to filter these frequency bands severely. The quality degradation by the interharmonic (and spectral-valley) attenuation itself may however be less important than that of the switching occasions. When the post filter is switched on, the background of a singing voice sounds suddenly muffled, and when the filter is deactivated, the background instantly becomes more sonorous. If the switching takes place frequently, due to the nature of the audio signal or to the configuration of the coding device, there will be a switching artefact. As one example, a USAC decoder may be operable either in an ACELP mode combined with post filtering or in a TCX mode without post filtering. The ACELP mode is used in episodes where a dominant vocal component is present. Thus, the switching into the ACELP mode may be triggered by the onset of singing, such as at the beginning of a new musical phrase, at the beginning of a new verse, or simply after an episode where the accompaniment is deemed to drown the singing voice in the sense that the vocal component is no longer prominent. Experiments have confirmed that an alternative solution, or rather circumvention of the problem, by which TCX coding is used throughout (and the ACELP mode is disabled) does not remedy the problem, as reverb-like artefacts appear.

Accordingly, in a first and a second aspect, the invention provides an audio encoding method (and an audio encoding system with the corresponding features) characterized by a decision being made as to whether the device which will decode the bit stream, which is output by the encoding method, should apply post filtering including attenuation of interharmonic noise. The outcome of the decision is encoded in the bit stream and is accessible to the decoding device.

By the invention, the decision whether to use the post filter is taken separately from the decision as to the most suitable coding mode. This makes it possible to maintain one post filtering status throughout a period of such length that the switching will not annoy the listener. Thus, the encoding method may prescribe that the post filter will be kept inactive even though it switches into a coding mode where the filter is conventionally active.

It is noted that the decision whether to apply post filtering is normally taken frame-wise. Thus, firstly, post filtering is not applied for less than one frame at a time. Secondly, the decision whether to disable post filtering is only valid for the duration of a current frame and may be either maintained or reassessed for the subsequent frame. In a coding format enabling a main frame format and a reduced format, which is a fraction of the normal format, e.g., ⅛ of its length, it may not be necessary to take post-filtering decisions for individual reduced frames. Instead, a number of reduced frames summing up to a normal frame may be considered, and the parameters relevant for the filtering decision may be obtained by computing the mean or median of the reduced frames comprised therein.

In a third and a fourth aspect of the invention, there is provided an audio decoding method (and an audio decoding system with corresponding features) with a decoding step followed by a post-filtering step, which includes interharmonic noise attenuation, and being characterized in a step of disabling the post filter in accordance with post filtering information encoded in the bit stream signal.

A decoding method with these characteristics is well suited for coding of mixed-origin audio signals by virtue of its capability to deactivate the post filter in dependence of the post filtering information only, hence independently of factors such as the current coding mode. When applied to coding techniques wherein post filter activity is conventionally associated with particular coding modes, the post-filtering disabling capability enables a new operative mode, namely the unfiltered application of a conventionally filtered decoding mode.

In a further aspect, the invention also provides a computer program product for performing one of the above methods. Further still, the invention provides a post filter for attenuating interharmonic noise which is operable in either an active mode or a pass-through mode, as indicated by a post-filtering signal supplied to the post filter. The post filter may include a decision section for autonomously controlling the post filtering activity.

As the skilled person will appreciate, an encoder adapted to cooperate with a decoder is equipped with functionally equivalent modules, so as to enable faithful reproduction of the encoded signal. Such equivalent modules may be identical or similar modules or modules having identical or similar transfer characteristics. In particular, the modules in the encoder and decoder, respectively, may be similar or dissimilar processing units executing respective computer programs that perform equivalent sets of mathematical operations.

In one embodiment, encoding the present method includes decision making as to whether a post filter which further includes attenuation of spectral valleys (with respect to the formant envelope, see above). This corresponds to the short-term portion of the post filter. It is then advantageous to adapt the criterion on which the decision is based to the nature of the post filter.

One embodiment is directed to an encoder particularly adapted for speech coding. As some of the problems motivating the invention have been observed when a mixture of vocal and other components is coded, the combination of speech coding and the independent decision-making regarding post filtering afforded by the invention is particularly advantageous. In particular, such a decoder may include a code-excited linear prediction encoding module.

In one embodiment, the encoder bases its decision on a detected simultaneous presence of a signal component with dominant fundamental frequency (pitch) and another signal component located below the fundamental frequency. The detection may also be aimed at finding the co-occurrence of a component with dominant fundamental frequency and another component with energy between the harmonics of this fundamental frequency. This is a situation wherein artefacts of the type under consideration are frequently encountered. Thus, if such simultaneous presence is established, the encoder will decide that post filtering is not suitable, which will be indicated accordingly by post filtering information contained in the bit stream.

One embodiment uses as its detection criterion the total signal power content in the audio time signal below a pitch frequency, possibly a pitch frequency estimated by a long-term prediction in the encoder. If this is greater than a predetermined threshold, it is considered that there are other relevant components than the pitch component (including harmonics), which will cause the post filter to be disabled.

In an encoder comprising a CELP module, use can be made of the fact that such a module estimates the pitch frequency of the audio time signal. Then, a further detection criterion is to check for energy content between or below the harmonics of this frequency, as described in more detail above.

As a further development of the preceding embodiment including a CELP module, the decision may include a comparison between an estimated power of the audio signal when CELP-coded (i.e., encoded and decoded) and an estimated power of the audio signal when CELP-coded and post-filtered. If the power difference is larger than a threshold, which may indicate that a relevant, non-noise component of the signal will be lost, and the encoder will decide to disable the post filter.

In an advantageous embodiment, the encoder comprises a CELP module and a TCX module. As is known in the art, TCX coding is advantageous in respect of certain kinds of signals, notably non-vocal signals. It is not common practice to apply post-filtering to a TCX-coded signal. Thus, the encoder may select either TCX coding, CELP coding with post filtering or CELP coding without post filtering, thereby covering a considerable range of signal types.

As one further development of the preceding embodiment, the decision between the three coding modes is taken on the basis of a rate-distortion criterion, that is, applying an optimization procedure known per se in the art.

In another further development of the preceding embodiment, the encoder further comprises an Advanced Audio Coding (AAC) coder, which is also known to be particularly suitable for certain types of signals. Preferably, the decision whether to apply AAC (frequency-domain) coding is made separately from the decision as to which of the other (linear-prediction) modes to use. Thus, the encoder can be apprehended as being operable in two super-modes, AAC or TCX/CELP, in the latter of which the encoder will select between TCX, post-filtered CELP or non-filtered CELP. This embodiment enables processing of an even wider range of audio signal types.

In one embodiment, the encoder can decide that a post filtering at decoding is to be applied gradually, that is, with gradually increasing gain. Likewise, it may decide that post filtering is to be removed gradually. Such gradual application and removal makes switching between regimes with and without post filtering less perceptible. As one example, a singing episode, for which post-filtered CELP coding is found to be suitable, may be preceded by an instrumental episode, wherein TCX coding is optimal; a decoder according to the invention may then apply post filtering gradually at or near the beginning of the singing episode, so that the benefits of post filtering are preserved even though annoying switching artefacts are avoided.

In one embodiment, the decision as to whether post filtering is to be applied is based on an approximate difference signal, which approximates that signal component which is to be removed from a future decoded signal by the post filter. As one option, the approximate difference signal is computed as the difference between the audio time signal and the audio time signal when subjected to (simulated) post filtering. As another option, an encoding section extracts an intermediate decoded signal, whereby the approximate difference signal can be computed as the difference between the audio time signal and the intermediate decoded signal when subjected to post filtering. The intermediate decoded signal may be stored in a long-term prediction buffer of the encoder. It may further represent the excitation of the signal, implying that further synthesis filtering (vocal tract, resonances) would need to be applied to obtain the final decoded signal. The point in using an intermediate decoded signal is that it captures some of the particularities, notably weaknesses, of the coding method, thereby allowing a more realistic estimation of the effect of the post filter. As a third option, a decoding section extracts an intermediate decoded signal, whereby the approximate difference signal can be computed as the difference between the intermediate decoded signal and the intermediate decoded signal when subjected to post filtering. This procedure probably gives a less reliable estimation than the two first options, but can on the other hand be carried out by the decoder in a standalone fashion.

The approximate difference signal thus obtained is then assessed with respect to one of the following criteria, which when settled in the affirmative will lead to a decision to disable the post filter:

a) whether the power of the approximate difference signal exceeds a predetermined threshold, indicating that a significant part of the signal would be removed by the post filter;
b) whether the character of the approximate difference signal is rather tonal than noise-like;
c) whether a difference between magnitude frequency spectra of the approximate difference signal and of the audio time signal is unevenly distributed with respect to frequency, suggesting that it is not noise but rather a signal that would make sense to a human listener;

d) whether a magnitude frequency spectrum of the approximate difference signal is localized to frequency intervals within a predetermined relevance envelope, based on what can usually be expected from a signal of the type to be processed; and e) whether a magnitude frequency spectrum of the approximate difference signal is localized to frequency intervals within a relevance envelope obtained by thresholding a magnitude frequency spectrum of the audio time signal by a magnitude of the largest signal component therein downscaled by a predetermined scale factor.

When evaluating criterion e), it is advantageous to apply peak tracking in the magnitude spectrum, that is, to distinguish portions having peak-like shapes normally associated with tonal components rather than noise. Components identified by peak tracking, which may take place by some algorithm known per se in the art, may be further sorted by applying a threshold to the peak height, whereby the remaining components are tonal material of a certain magnitude. Such components usually represent relevant signal content rather than noise, which motivates a decision to disable the post filter.

In one embodiment of the invention as a decoder, the decision to disable the post filter is executed by a switch controllable by the control section and capable of bypassing the post filter in the circuit. In another embodiment, the post filter has variable gain controllable by the control section, or a gain controller therein, wherein the decision to disable is carried out by setting the post filter gain (see previous section) to zero or by setting its absolute value below a predetermined threshold.

In one embodiment, decoding according to the present invention includes extracting post filtering information from the bit stream signal which is being decoded. More precisely, the post filtering information may be encoded in a data field comprising at least one bit in a format suitable for transmission. Advantageously, the data field is an existing field defined by an applicable standard but not in use, so that the post filtering information does not increase the payload to be transmitted.

In other embodiments, an audio decoder for decoding an audio bitstream is disclosed. The decoder includes a first decoding module adapted to operate in a first coding mode and a second decoding module adapted to operate in a second coding mode, the second coding mode being different from the first coding mode. The decoder further includes a pitch filter in either the first coding mode or the second coding mode, the pitch filter adapted to filter a preliminary audio signal generated by the first decoding module or the second decoding module to obtain a filtered signal. The pitch filter is selectively enabled or disabled based on a value of a first parameter encoded in the audio bitstream, the first parameter being distinct from a second parameter encoded in the audio bitstream, the second parameter specifying a current coding mode of the audio decoder.

In some embodiments, a pitch filter for filtering a preliminary audio signal generated from an audio bitstream is disclosed. The pitch filter has an operating mode selected from one of either: (i) an active mode where the preliminary audio signal is filtered using filtering information to obtain a filtered audio signal, and (ii) an inactive mode where the pitch filter is disabled. The preliminary audio signal is generated in an audio encoder or audio decoder having a coding mode selected from at least two distinct coding modes, and the pitch filter is capable of being selectively operated in either the active mode or the inactive mode while operating in the coding mode based on control information.

It is noted that the methods and apparatus disclosed in this section may be applied, after appropriate modifications within the skilled person's abilities including routine experimentation, to coding of signals having several components, possibly corresponding to different channels, such as stereo channels. Throughout the present application, pitch enhancement and post filtering are used as synonyms. It is further noted that AAC is discussed as a representative example of frequency-domain coding methods. Indeed, applying the invention to a decoder or encoder operable in a frequency-domain coding mode other than AAC will only require small modifications, if any, within the skilled person's abilities. Similarly, TCX is mentioned as an example of weighted linear prediction transform coding and of transform coding in general.

Features from two or more embodiments described hereinabove can be combined, unless they are clearly complementary, in further embodiments. The fact that two features are recited in different claims does not preclude that they can be combined to advantage. Likewise, further embodiments can also be provided by the omission of certain features that are not necessary or not essential for the desired purpose.

BRIEF DESCRIPTION OF THE DRAWINGS

Embodiments of the present invention will now be described with reference to the accompanying drawings, on which.

DETAILED DESCRIPTION OF EMBODIMENTS

Figure 1:
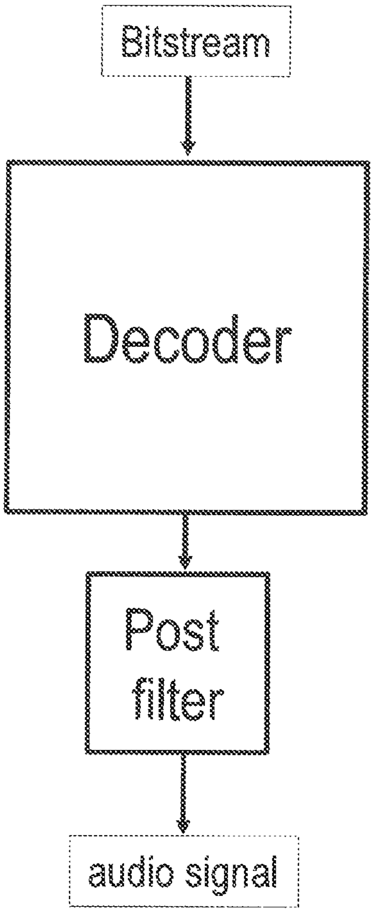
Fig. 1 (prior art)
FIG. 1 is a block diagram showing a conventional decoder with post filter.
Figure 3:
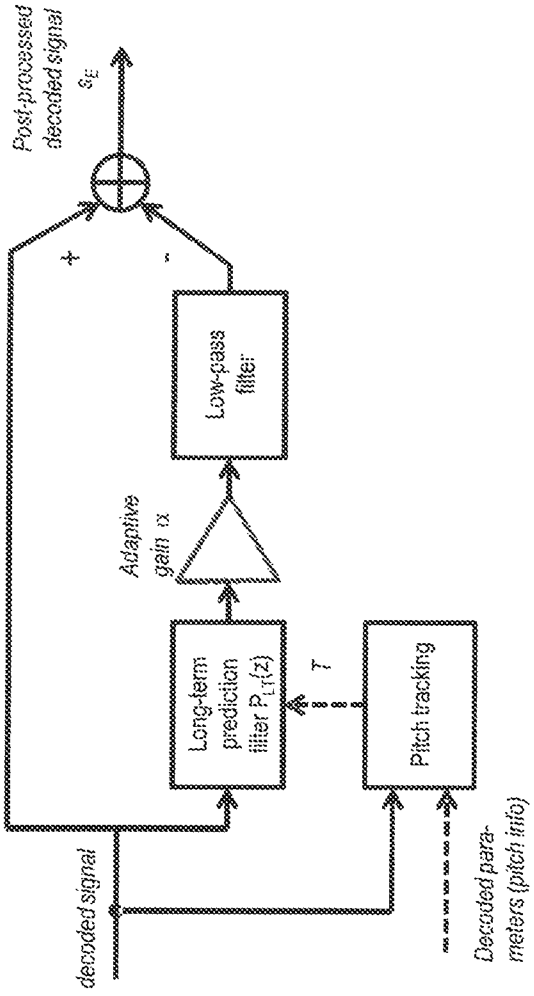
FIG. 3 is a block diagram illustrating the structure of a post filter.
Figure 4:
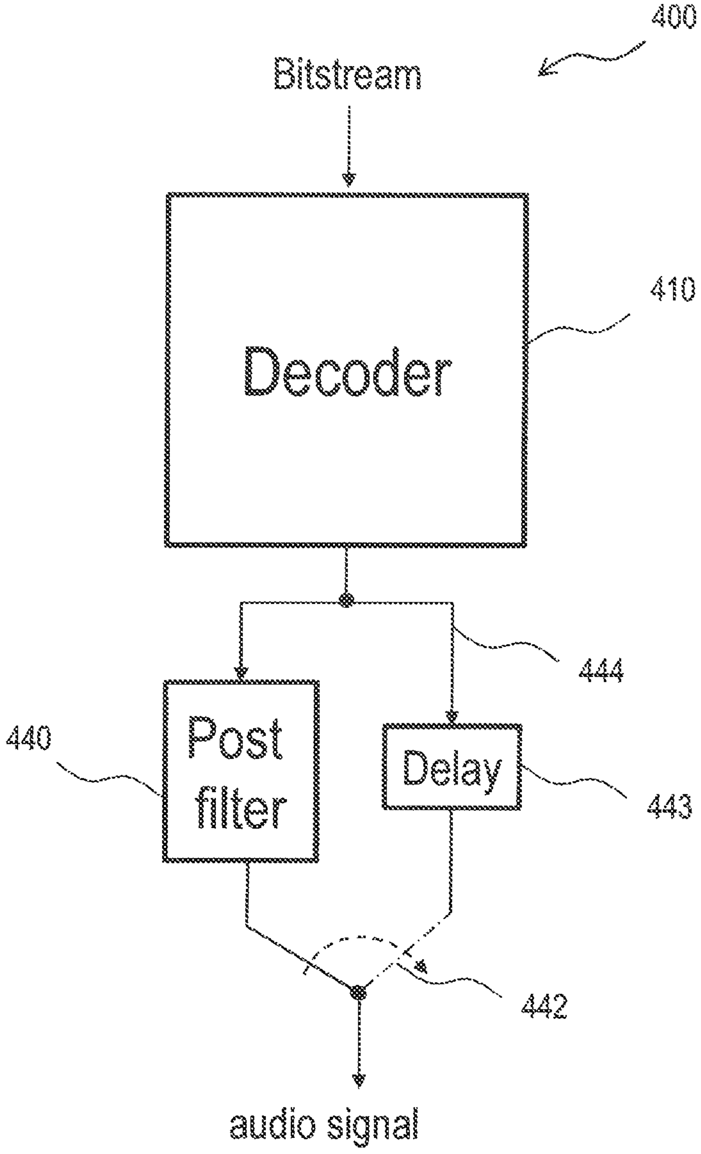
FIGS. 4 and 5 are block diagrams of two decoders according to the invention.

FIG. 4 is a schematic drawing of a decoder system 400 according to an embodiment of the invention, having as its input a bit stream signal and as its output an audio signal. As in the conventional decoders shown in FIG. 1, a post filter 440 is arranged downstream of a decoding module 410 but can be switched into or out of the decoding path by operating a switch 442. The post filter is enabled in the switch position shown in the figure. It would be disabled if the switch was set in the opposite position, whereby the signal from the decoding module 410 would instead be conducted over the bypass line 444. As an inventive contribution, the switch 442 is controllable by post filtering information contained in the bit stream signal, so that post filtering may be applied and removed irrespectively of the current status of the decoding module 410. Because a post filter 440 operates at some delay—for example, the post filter shown in FIG. 3 will introduce a delay amounting to at least the pitch period T—a compensation delay module 443 is arranged on the bypass line 444 to maintain the modules in a synchronized condition at switching. The delay module 443 delays the signal by the same period as the post filter 440 would, but does not otherwise process the signal. To minimize the change-over time, the compensation delay module 443 receives the same signal as the post filter 440 at all times. In an alternative embodiment where the post filter 440 is replaced by a zero-delay post filter (e.g., a causal filter, such as a filter with two taps, independent of future signal values), the compensation delay module 443 can be omitted.

Figure 2:
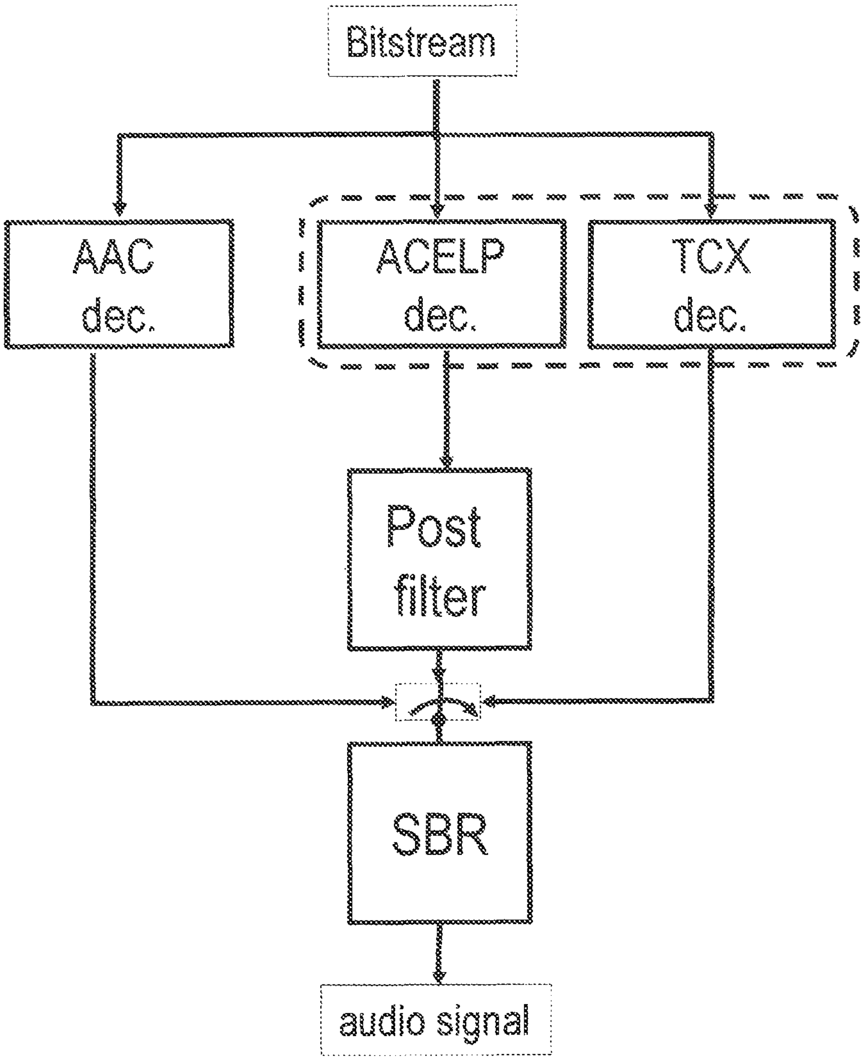
Fig. 2 (prior art)
FIG. 2 is a schematic block diagram of a conventional decoder operable in AAC, ACELP and TCX mode and including a post filter permanently connected downstream of the ACELP module.
Figure 5:
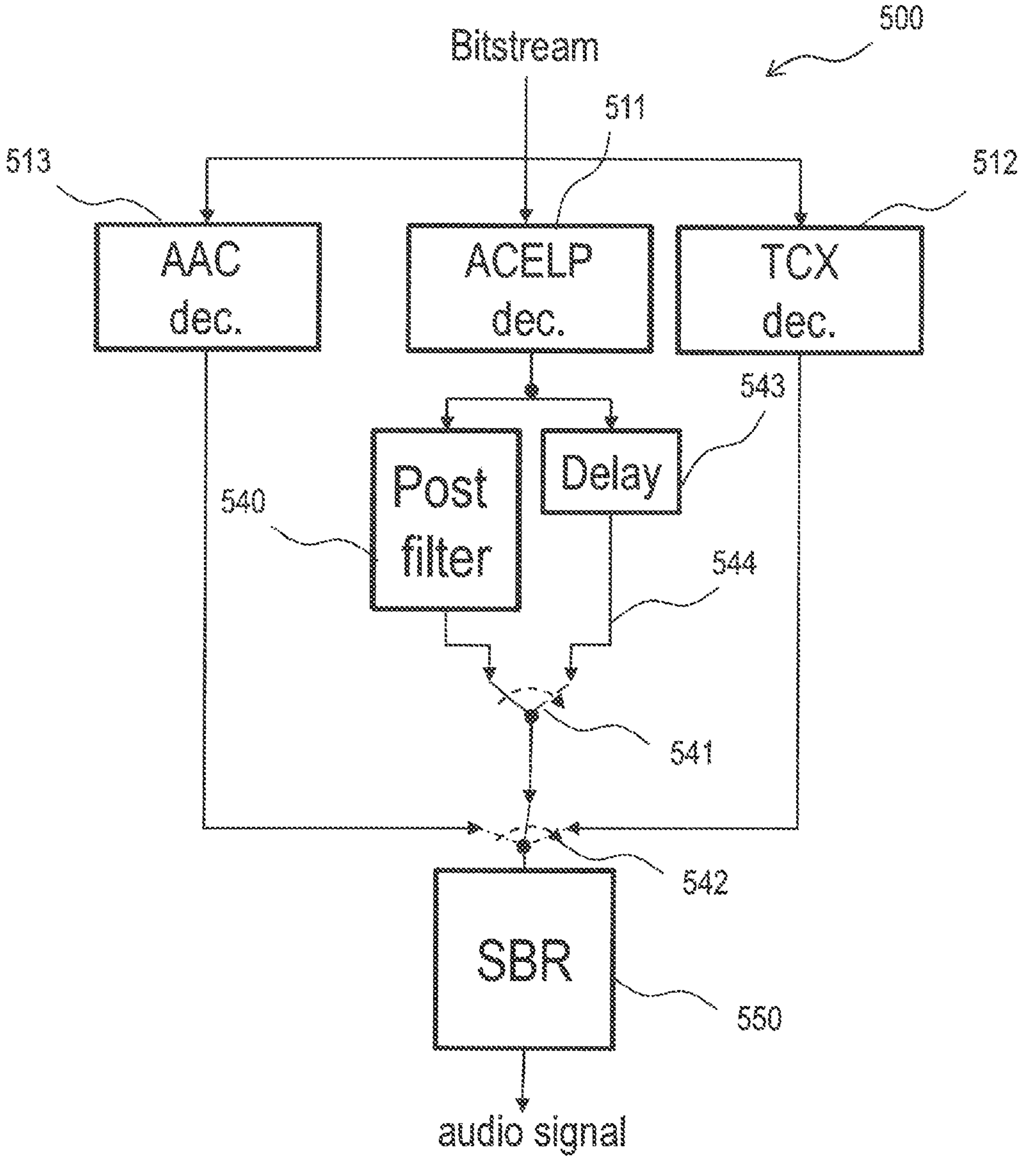

FIG. 5 illustrates a further development according to the teachings of the invention of the triple-mode decoder system 500 of FIG. 2. An ACELP decoding module 511 is arranged in parallel with a TCX decoding module 512 and an AAC decoding module 513. In series with the ACELP decoding module 511 is arranged a post filter 540 for attenuating noise, particularly noise located between harmonics of a pitch frequency directly or indirectly derivable from the bit stream signal for which the decoder system 500 is adapted. The bit stream signal also encodes post filtering information governing the positions of an upper switch 541 operable to switch the post filter 540 out of the processing path and replace it with a compensation delay 543 like in FIG. 4. A lower switch 542 is used for switching between different decoding modes. With this structure, the position of the upper switch 541 is immaterial when one of the TCX or AAC modules 512, 513 is used; hence, the post filtering information does not necessary indicate this position except in the ACELP mode. Whatever decoding mode is currently used, the signal is supplied from the downstream connection point of the lower switch 542 to a spectral band replication (SBR) module 550, which outputs an audio signal. The skilled person will realize that the drawing is of a conceptual nature, as is clear notably from the switches which are shown schematically as separate physical entities with movable contacting means. In a possible realistic implementation of the decoder system, the switches as well as the other modules will be embodied by computer-readable instructions.

Figure 6:
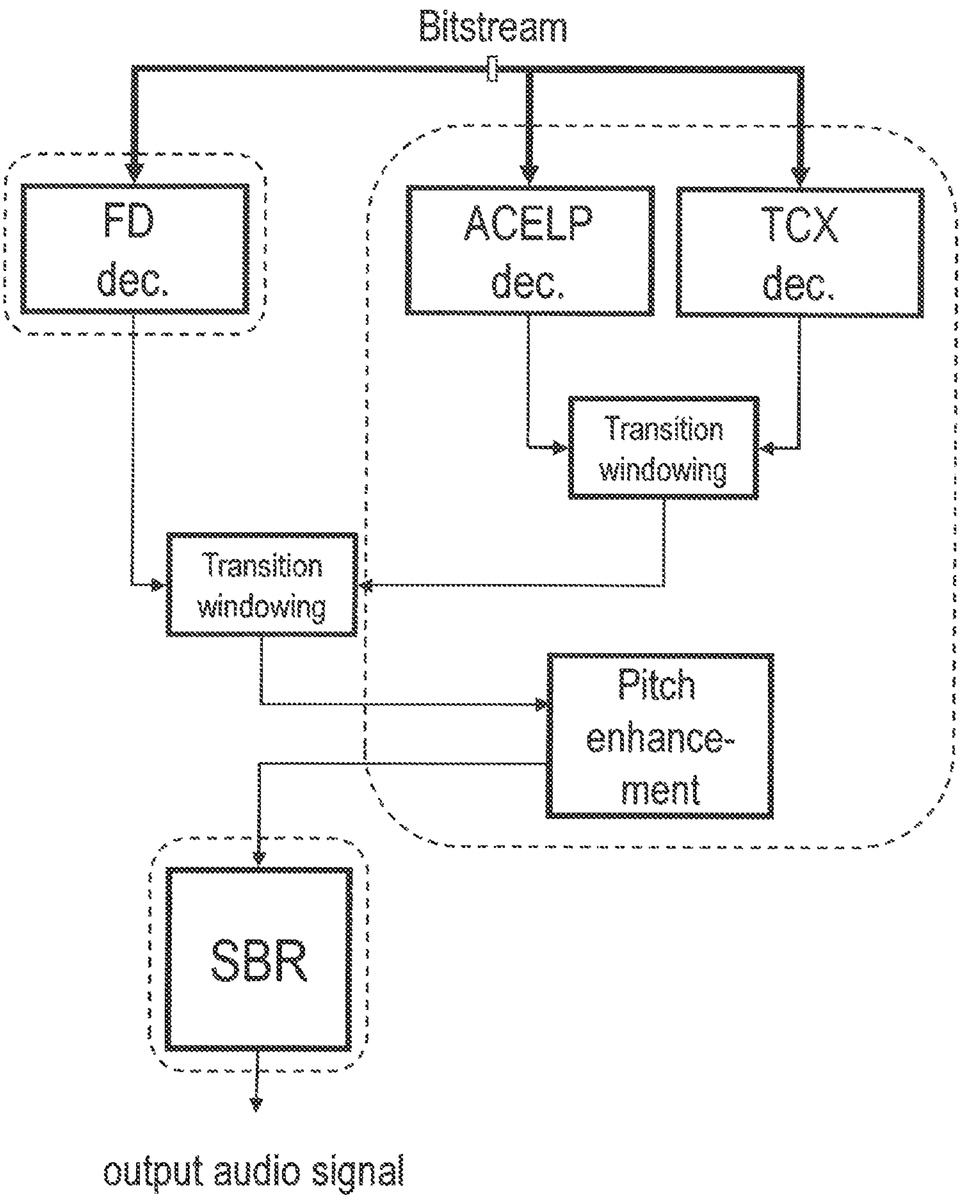
Fig. 6 (prior art)
FIGS. 6 and 7 are block diagrams illustrating differences between a conventional decoder (FIG. 6) and a decoder (FIG. 7) according to the invention.
Figure 7:
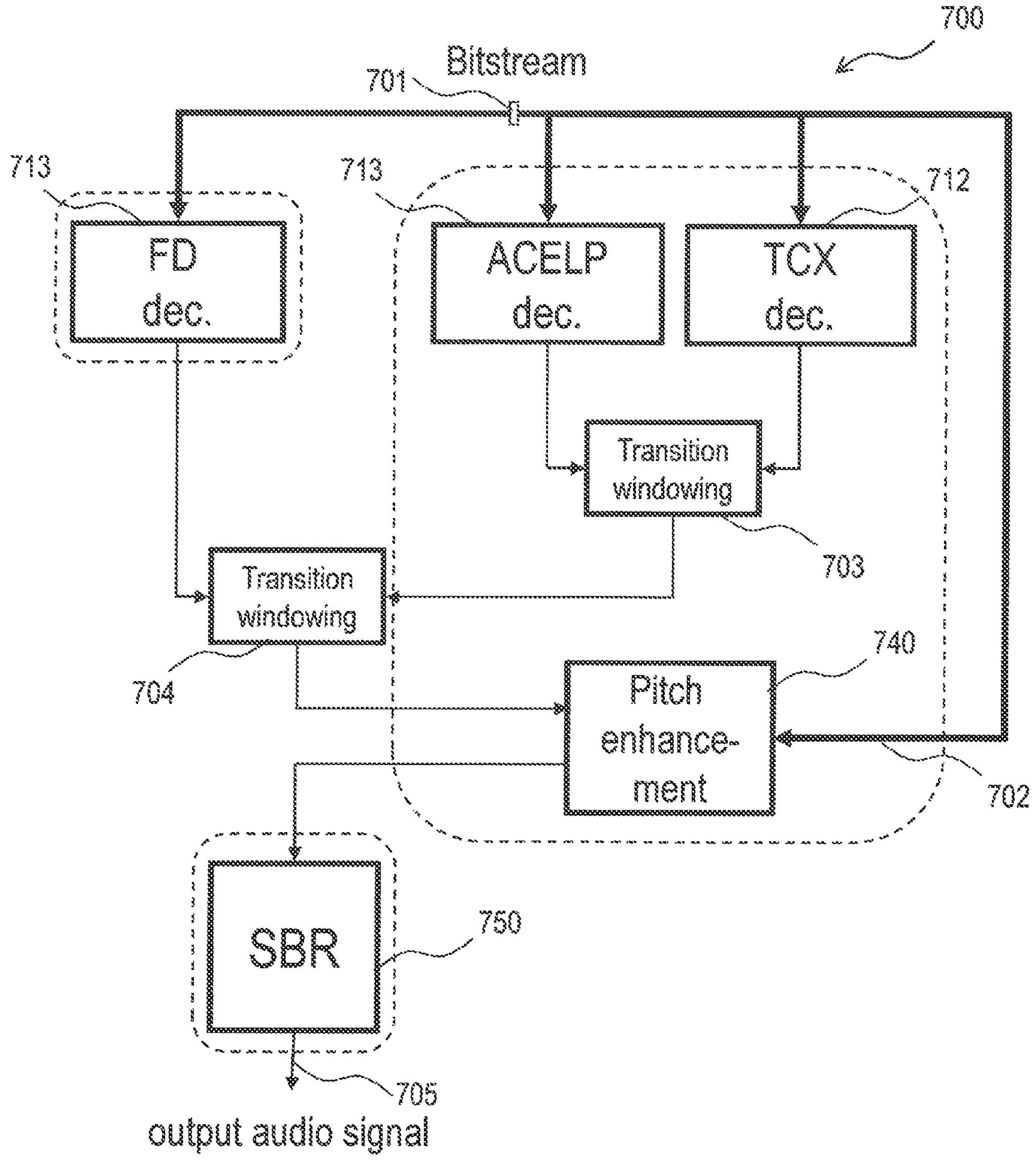

FIGS. 6 and 7 are also block diagrams of two triple-mode decoder systems operable in an ACELP, TCX or frequency-domain decoding mode. With reference to the latter figure, which shows an embodiment of the invention, a bit stream signal is supplied to an input point 701, which is in turn permanently connected via respective branches to the three decoding modules 711, 712, 713. The input point 701 also has a connecting branch 702 (not present in the conventional decoding system of FIG. 6) to a pitch enhancement module 740, which acts as a post filter of the general type described above. As is common practice in the art, a first transition windowing module 703 is arranged downstream of the ACELP and TCX modules 711, 712, to carry out transitions between the decoding modules. A second transition module 704 is arranged downstream of the frequency-domain decoding module 713 and the first transition windowing module 703, to carry out transition between the two super-modes. Further a SBR module 750 is provided immediately upstream of the output point 705. Clearly, the bit stream signal is supplied directly (or after demultiplexing, as appropriate) to all three decoding modules 711, 712, 713 and to the pitch enhancement module 740. Information contained in the bit stream controls what decoding module is to be active. By the invention however, the pitch enhancement module 740 performs an analogous self actuation, which responsive to post filtering information in the bit stream may act as a post filter or simply as a pass-through. This may for instance be realized through the provision of a control section (not shown) in the pitch enhancement module 740, by means of which the post filtering action can be turned on or off. The pitch enhancement module 740 is always in its pass-through mode when the decoder system operates in the frequency-domain or TCX decoding mode, wherein strictly speaking no post filtering information is necessary. It is understood that modules not forming part of the inventive contribution and whose presence is obvious to the skilled person, e.g., a demultiplexer, have been omitted from FIG. 7 and other similar drawings to increase clarity.

As a variation, the decoder system of FIG. 7 may be equipped with a control module (not shown) for deciding whether post filtering is to be applied using an analysis-by-synthesis approach. Such control module is communicatively connected to the pitch enhancement module 740 and to the ACELP module 711, from which it extracts an intermediate decoded signal $s_{i\_DEC}(n)$ representing an intermediate stage in the decoding process, preferably one corresponding to the excitation of the signal. The detection module has the necessary information to simulate the action of the pitch enhancement module 740, as defined by the transfer functions $P_{LT}(z)$ and $H_{LP}(z)$ (cf. Background section and FIG. 3), or equivalently their filter impulse responses $P_{LT}(z)$ and $h_{LP}(n)$. As follows by the discussion in the Background section, the component to be subtracted at post filtering can be estimated by an approximate difference signal $s_{AD}(n)$ which is proportional to $[(s_{i\_DEC}*P_{LT})*h_{LP}](n)$, where * denotes discrete convolution. This is an approximation of the true difference between the original audio signal and the post-filtered decoded signal, namely $$s_{ORIG}(n)-s_E(n)=s_{ORIG}(n)-(s_{DEC}(n)-\alpha[s_{DEC}*p_{LT}*h_{LP}](n)),$$

where $\alpha$ is the post filter gain. By studying the total energy, low-band energy, tonality, actual magnitude spectrum or past magnitude spectra of this signal, as disclosed in the Summary section and the claims, the control section may find a basis for the decision whether to activate or deactivate the pitch enhancement module 740.

Figure 8:
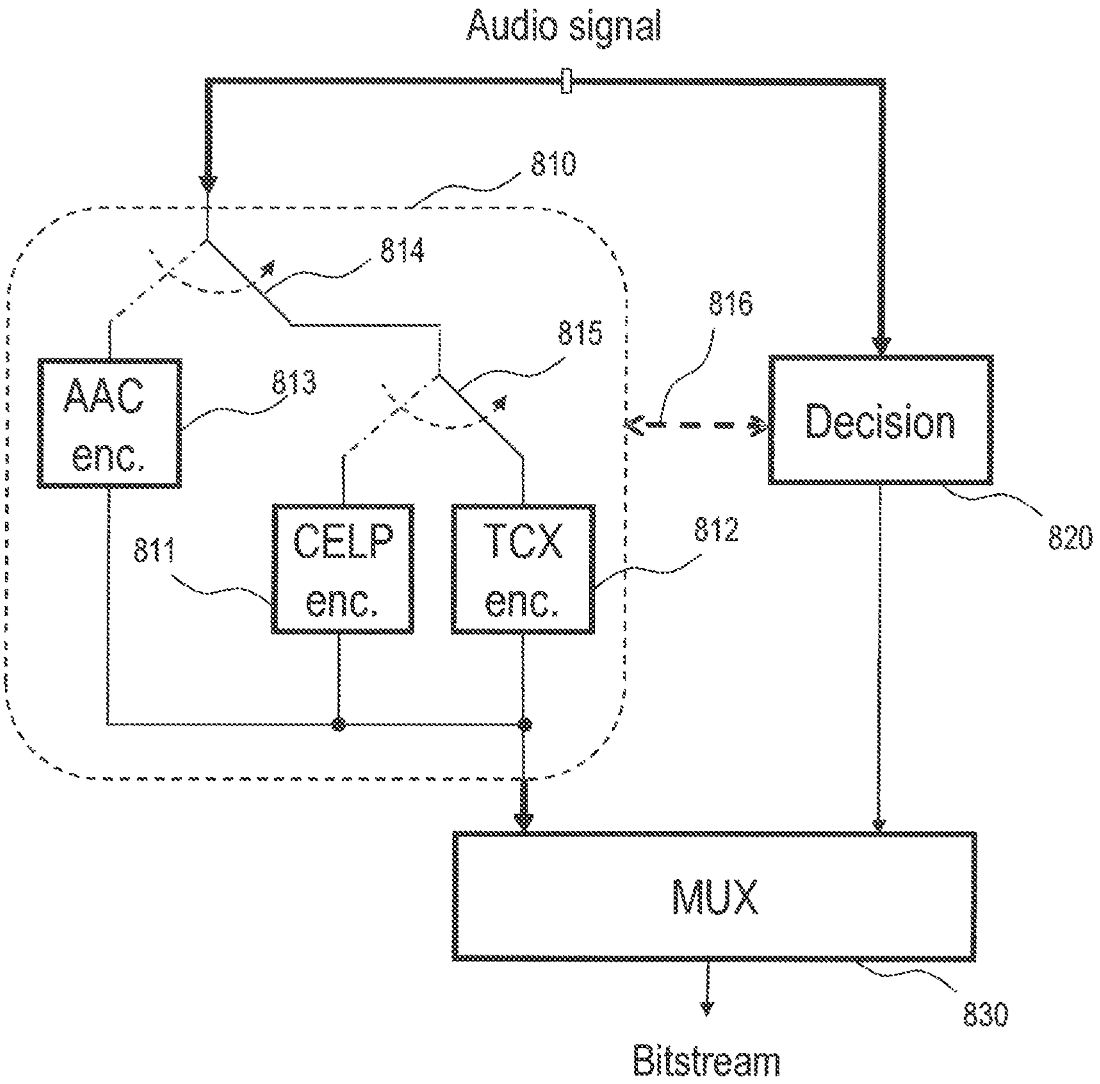
FIG. 8 is a block diagram of an encoder according to the invention.

FIG. 8 shows an encoder system 800 according to an embodiment of the invention. The encoder system 800 is adapted to process digital audio signals, which are generally obtained by capturing a sound wave by a microphone and transducing the wave into an analog electric signal. The electric signal is then sampled into a digital signal susceptible to be provided, in a suitable format, to the encoder system 800. The system generally consists of an encoding module 810, a decision module 820 and a multiplexer 830. By virtue of switches 814, 815 (symbolically represented), the encoding module 810 is operable in either a CELP, a TCX or an AAC mode, by selectively activating modules 811, 812, 813. The decision module 820 applies one or more predefined criteria to decide whether to disable post filtering during decoding of a bit stream signal produced by the encoder system 800 to encode an audio signal. For this purpose, the decision module 820 may examine the audio signal directly or may receive data from the encoding module 810 via a connection line 816. A signal indicative of the decision taken by the decision module 820 is provided, together with the encoded audio signal from the encoding module 810, to a multiplexer 830, which concatenates the signals into a bit stream constituting the output of the encoder system 800.

Preferably, the decision module 820 bases its decision on an approximate difference signal computed from an intermediate decoded signal $s_{i\_DEC}$, which can be subtracted from the encoding module 810. The intermediate decoded signal represents an intermediate stage in the decoding process, as discussed in preceding paragraphs, but may be extracted from a corresponding stage of the encoding process. However, in the encoder system 800 the original audio signal $s_{ORIG}$ is available so that, advantageously, the approximate difference signal is formed as:

$$s_{ORIG}(n)-(s_{i\_DEC}(n)-\alpha[(s_{i\_DEC}*p_{LT})*h_{LP}](n)).$$

The approximation resides in the fact that the intermediate decoded signal is used in lieu of the final decoded signal. This enables an appraisal of the nature of the component that a post filter would remove at decoding, and by applying one of the criteria discussed in the Summary section, the decision module 820 will be able to take a decision whether to disable post filtering.

As a variation to this, the decision module 820 may use the original signal in place of an intermediate decoded signal, so that the approximate difference signal will be $[(s_{i\_DEC}*P_{LT})*h_{LP}](n)$. This is likely to be a less faithful approximation but on the other hand makes the presence of a connection line 816 between the decision module 820 and the encoding module 810 optional.

In such other variations of this embodiment where the decision module 820 studies the audio signal directly, one or more of the following criteria may be applied:

- Does the audio signal contain both a component with dominant fundamental frequency and a component located below the fundamental frequency? (The fundamental frequency may be supplied as a by-product of the encoding module 810.)
- Does the audio signal contain both a component with dominant fundamental frequency and a component located between the harmonics of the fundamental frequency?
- Does the audio signal contain significant signal energy below the fundamental frequency?
- Is post-filtered decoding (likely to be) preferable to unfiltered decoding with respect to rate-distortion optimality?

In all the described variations of the encoder structure shown in FIG. 8—that is, irrespectively of the basis of the detection criterion—the decision section 820 may be enabled to decide on a gradual onset or gradual removal of post filtering, so as to achieve smooth transitions. The gradual onset and removal may be controlled by adjusting the post filter gain.

Figure 9:
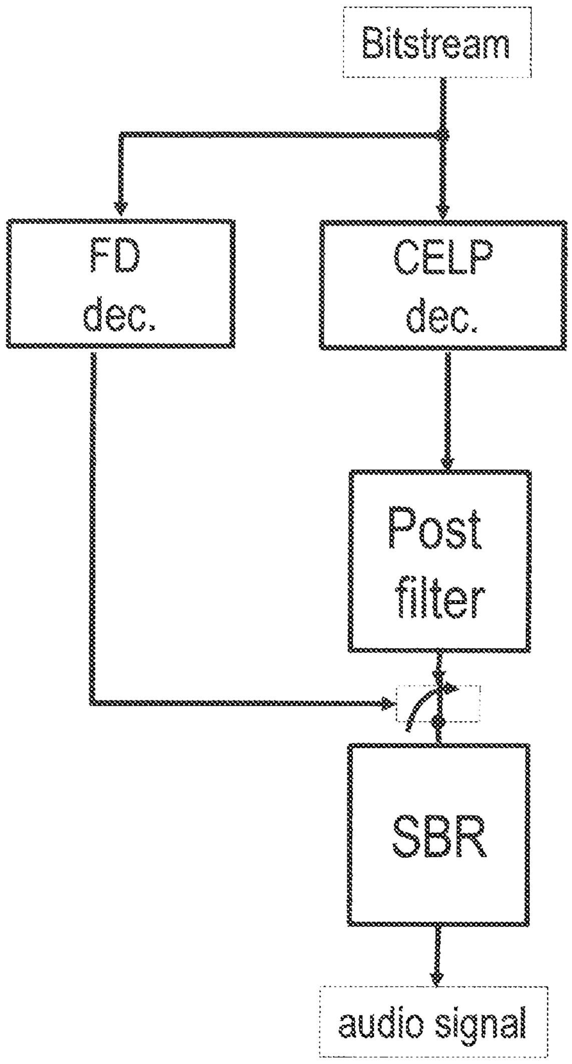
Fig. 9 (prior art)
FIGS. 9 and 10 are block diagrams illustrating differences between a conventional decoder (FIG. 9) and a decoder (FIG. 10) according to the invention.
Figure 10:
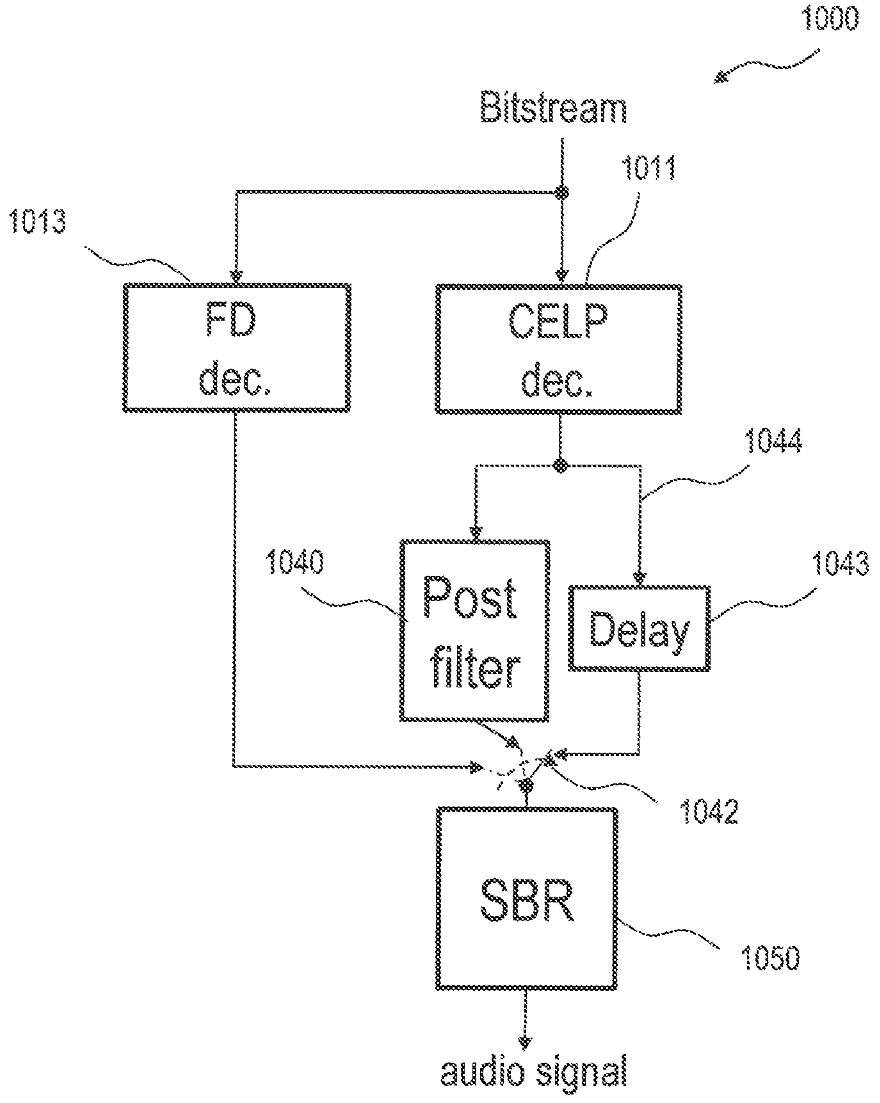

FIG. 9 shows a conventional decoder operable in a frequency-decoding mode and a CELP decoding mode depending on the bit stream signal supplied to the decoder. Post filtering is applied whenever the CELP decoding mode is selected. An improvement of this decoder is illustrated in FIG. 10, which shows a decoder 1000 according to an embodiment of the invention. This decoder is operable not only in a frequency-domain-based decoding mode, wherein the frequency-domain decoding module 1013 is active, and a filtered CELP decoding mode, wherein the CELP decoding module 1011 and the post filter 1040 are active, but also in an unfiltered CELP mode, in which the CELP module 1011 supplies its signal to a compensation delay module 1043 via a bypass line 1044. A switch 1042 controls what decoding mode is currently used responsive to post filtering information contained in the bit stream signal provided to the decoder 1000. In this decoder and that of FIG. 9, the last processing step is effected by an SBR module 1050, from which the final audio signal is output.

Figure 11:
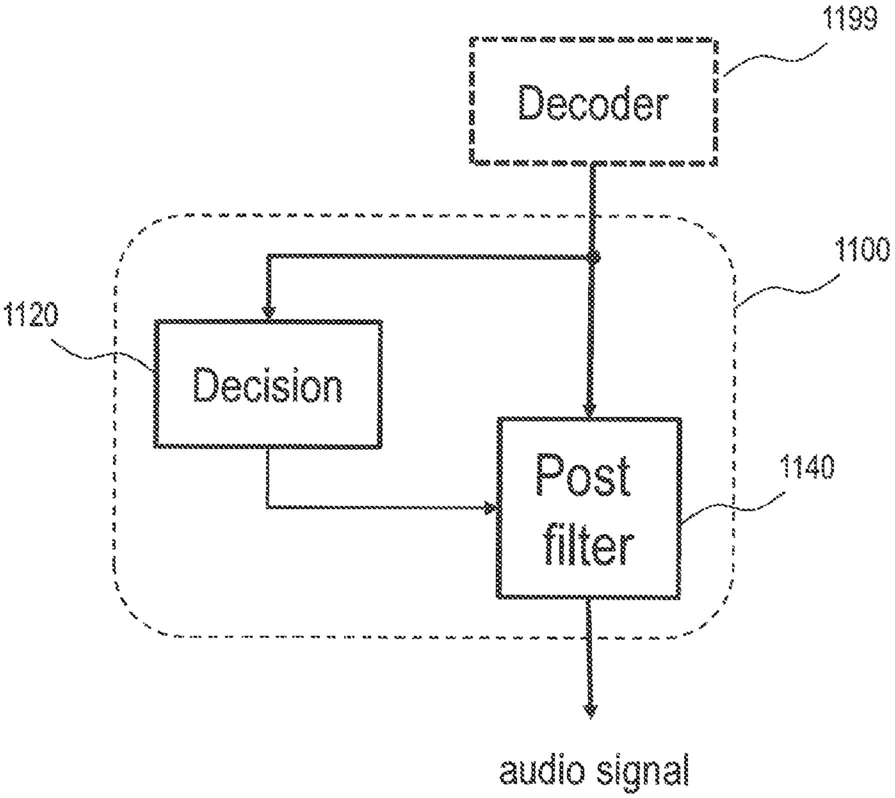
FIG. 11 is a block diagram of an autonomous post filter which can be selectively activated and deactivated.

FIG. 11 shows a post filter 1100 suitable to be arranged downstream of a decoder 1199. The filter 1100 includes a post filtering module 1140, which is enabled or disabled by a control module (not shown), notably a binary or non-binary gain controller, in response to a post filtering signal received from a decision module 1120 within the post filter 1100. The decision module performs one or more tests on the signal obtained from the decoder to arrive at a decision whether the post filtering module 1140 is to be active or inactive. The decision may be taken along the lines of the functionality of the decision module 820 in FIG. 8, which uses the original signal and/or an intermediate decoded signal to predict the action of the post filter. The decision of the decision module 1120 may also be based on similar information as the decision modules uses in those embodiments where an intermediate decoded signal is formed. As one example, the decision module 1120 may estimate a pitch frequency (unless this is readily extractable from the bit stream signal) and compute the energy content in the signal below the pitch frequency and between its harmonics. If this energy content is significant, it probably represents a relevant signal component rather than noise, which motivates a decision to disable the post filtering module 1140.

A 6-person listening test has been carried out, during which music samples encoded and decoded according to the invention were compared with reference samples containing the same music coded while applying post filtering in the conventional fashion but maintaining all other parameters unchanged. The results confirm a perceived quality improvement.

Further embodiments of the present invention will become apparent to a person skilled in the art after reading the description above. Even though the present description and drawings disclose embodiments and examples, the invention is not restricted to these specific examples. Numerous modifications and variations can be made without departing from the scope of the present invention, which is defined by the accompanying claims.

The systems and methods disclosed hereinabove may be implemented as software, firmware, hardware or a combination thereof. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A decoder system for decoding a bit stream signal as an audio time signal, including:

a decoding section for decoding a bit stream signal as a preliminary audio time signal, the decoding section being operable in at least one first decoding mode including post-filtering, and at least one second decoding mode not including post-filtering; and a pitch enhancement filter for post-filtering the preliminary audio time signal to obtain an audio time signal, wherein the pitch enhancement is controlled by a post filter gain, characterized by a control section adapted to, in said at least one first decoding mode, responsive only to post-filtering information encoded in the bit stream signal, selectively disable the pitch enhancement filter by setting the post filter gain to zero, the post-filtering information being indicative of an encoder-side decision whether to disable post filtering, whereby the preliminary audio time signal is output as the audio time signal.

2. The decoder system of claim 1, said decoding section including a code-excited linear prediction, CELP, decoding module.

3. The decoder system of claim 2, wherein the decoding section further includes a frequency-domain decoding module.

4. The decoder system of claim 1, wherein the pitch enhancement filter includes a gain controller for setting the post filter gain to zero when the pitch enhancement filter is disabled.

5. The decoder system of claim 1 wherein the pitch enhancement filter is a bass post-filter.

6. A method of decoding a bit stream signal as an audio time signal, including the steps of:

decoding a bit stream signal as a preliminary audio time signal in one of a plurality of decoding modes, said plurality of decoding modes including at least one first decoding mode including a post-filtering step, and at least one second decoding mode not including post-filtering step;

wherein the post-filtering step applies a pitch-enhancement filter to the preliminary audio time signal, thereby obtaining an audio time signal, wherein the pitch enhancement filter is controlled by a post filter gain, characterized in that, in said at least one first decoding mode, the post-filtering step is selectively disabled responsive only to post-filtering information encoded in the bit stream signal by setting the post filter gain to zero, the post-filtering information being indicative of an encoder-side decision whether to disable post filtering.

7. A non-transitory computer-readable storage medium comprising a sequence of instructions which, when executed by one or more processors, cause the one or more processors to perform the method of claim 6.

* * * * *